Oct. 9, 1934.                R. D. CONKLIN                1,975,828
                 PNEUMATIC TREADLE CONTROL MECHANISM
                       Filed Aug. 4, 1933         3 Sheets-Sheet 1
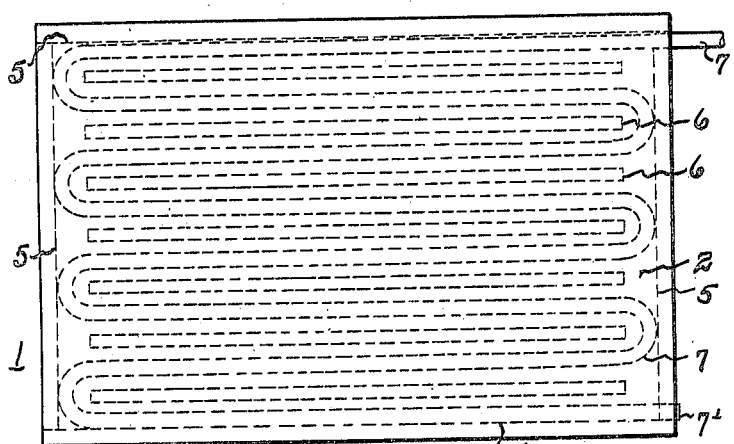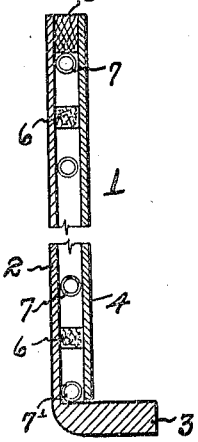
Fig. 1.  Fig. 2.
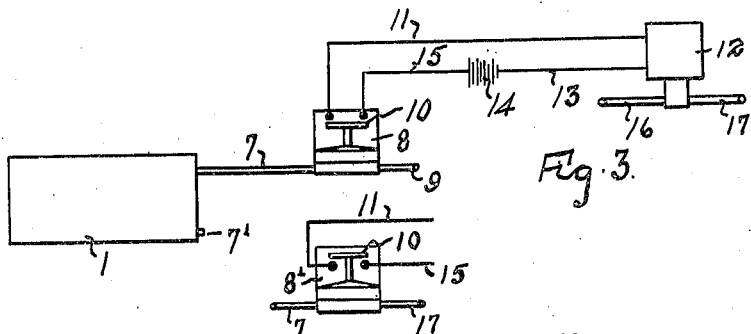
Fig. 3.
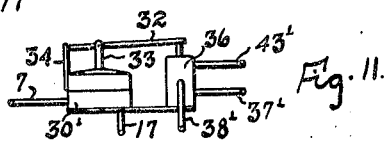
Fig. 8.
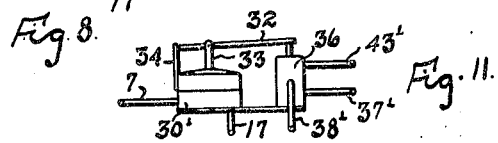
Fig. 11.
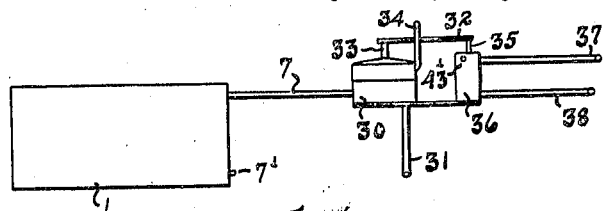
Fig. 6.
INVENTOR.
Roscoe D. Conklin
BY Darby & Darby
ATTORNEYS.

Oct. 9, 1934.  R. D. CONKLIN  1,975,828
PNEUMATIC TREADLE CONTROL MECHANISM
Filed Aug. 4, 1933  3 Sheets-Sheet 2

INVENTOR.
Roscoe D. Conklin
BY Darby & Darby
ATTORNEYS.

Oct. 9, 1934.   R. D. CONKLIN   1,975,828
PNEUMATIC TREADLE CONTROL MECHANISM
Filed Aug. 4, 1933   3 Sheets-Sheet 3

INVENTOR.
Roscoe D. Conklin
BY Darby & Darby
ATTORNEYS.

Patented Oct. 9, 1934

1,975,828

UNITED STATES PATENT OFFICE 1,975,828

PNEUMATIC TREADLE CONTROL MECHANISM

Roscoe D. Conklin, Rahway, N. J., assignor to National Pneumatic Company, New York, N. Y., a corporation of West Virginia Application August 4, 1933, Serial No. 683,609

2 Claims. (Cl. 121—1)

This invention relates to improvements in pneumatically operated door mechanism of the treadle controlled type involving the use of a pneumatic treadle for controlling the pneumatic operating door apparatus.

An object of this invention is to provide an improved form of pneumatic treadle control in which a compressible treadle controls an air stream in which variations in the pressure thereof as produced by the application of pressure to the treadle effects a control of mechanism which in turn controls the door operating mechanism.

A further object of this invention is to employ a pneumatic treadle which through the intermediate agency of either electro-pneumatic or straight pneumatic mechanism controls the operation of other devices such for example as door operating motors.

These and many other objects as will appear from the following disclosure are secured by means of this invention. This invention resides substantially in the combination, construction, arrangement and relative location of parts, all as will be described in greater detail in the following specification:

Referring to the drawings:

Fig. 1 is a top plan view of the improved pneumatic treadle of this invention;

Fig. 2 is a transverse cross-sectional view thereof;

Fig. 3 is a diagrammatic illustration of one form of control mechanism employing the pneumatic treadle;

Fig. 6 is a diagrammatic illustration of a modified form of straight pneumatic apparatus;

Fig. 8 illustrates diagrammatically the change necessary to operate the apparatus on vacuum as distinguished from the previously described pressure operated types;

Fig. 11 illustrates diagrammatically the changes necessary to operate the straight pneumatic type on vacuum as distinguished from the corresponding previously described fluid pressure operated type.

Figure 4:
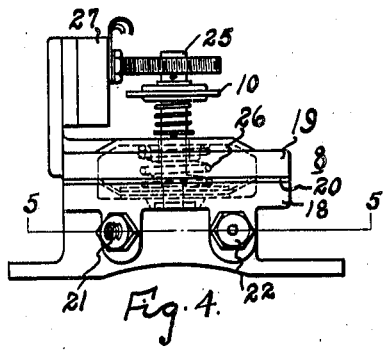
Fig. 4 is an elevational view of the pressure operated switch.

It is common practice in the operation of transportation systems, such as subways, busses and the like, to provide treadle control mechanism for the doors of the vehicle. It is also common practice to employ treadle control mechanism for opening and closing doors in buildings. The most commonly used types of treadle control employ a control switch or valve which is directly operated by movements of the treadle usually placed adjacent the door to be operated.

A purpose of this invention is to provide an improved form of pneumatic treadle which may be likened to the prior art type in which the treadle plate directly actuates a valve. However, with the mechanism of this invention, a much simplified structure is provided and one which is rugged and dependable in operation.

In the present invention a collapsible tube such as for example, a soft rubber tube, through which a uniformly flowing stream of air passes either under pressure greater than atmospheric or less than atmospheric pressure forms part of the treadle which is connected to control mechanism which will be actuated when the movement of this stream is interrupted by pressure applied to the treadle. There are disclosed herein several forms of apparatus controlled by such a treadle which may broadly be divided into classes of electro-pneumatic control and straight pneumatic control.

Referring to the drawings, the invention will now be described in full detail. The treadle structure is generally indicated at 1 in Figs. 1 and 2. It comprises an upper tread plate 2 and a base plate 4 which are preferably made of a flexible material such as rubber, rubberized fabric and the like. The tread and base plates are secured together around the edges to provide a closed compartment and are held in spaced relation by means of the strips 5 which may be made of any suitable material but preferably of a stiff relatively hard rubber so that parts may be vulcanized together.

The forward edge of the tread plate is formed at right angles to the plane thereof and is preferably of thicker cross-section as indicated at 3 to form a nose which fits over the edge of the step adjacent the door to be controlled. Interposed between the plates of the treadle at spaced points are the soft or compressible rubber strips 6 which act to normally hold the plates in proper spaced relation. Distributed in any suitable manner within the compartment of the treadle is a soft flexible tube 7, preferably made of soft rubber, which opens at the end 7' directly into the atmosphere. The other end of this tube extends to the apparatus to be controlled as indicated for example in Fig. 3. As shown in this figure, the tube extends to a fluid pressure operated switch indicated generally at 8, having a connection 9, which extends to any suitable fluid pressure source. The contact disc 10 of the switch is positioned to engage two fixed contacts, one of which is connected by wire 11 to the magnet valve 12. The other terminal of this valve is connected to one terminal of a current source 14 which has its other terminal connected by wire 15 to the other fixed contact of the switch. The pipe 16 connects the control valve to a suitable fluid pressure source, and the pipe 17 extends to the device to be controlled, such as for example, a door operating motor.

Figure 5:
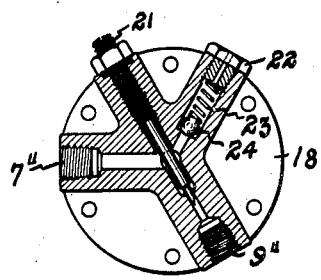
Fig. 5 is a cross-sectional view taken on the line 5—5 of Fig. 4.

The structure of the fluid pressure operated switch, as clearly shown in Figs. 4 and 5, comprises a base portion 18 and a cap portion 19 secured thereto. Firmly sealed between the parts 18 and 19 is a flexible diaphragm 20 to which is secured in accordance with well known practice, a stem 25 on which the contact 10 is slidably and resiliently mounted. The fixed contacts to be interconnected by the contact plate 10 are mounted on a suitable insulating support 27. The base portion 18 is provided with a series of converging passages as is clear from Fig. 5, which are connected by a vertical passage with the chamber in which the diaphragm 20 operates. The passage 7'' is the one to which the flexible tube of the treadle 7 connects. The passage 9'' is the one to which the pipe 9 from any suitable fluid pressure source connects. An adjustable needle valve 21 controls the rate of flow of fluid pressure from the source to the pipe 7. The final passage is closed by means of an apertured plug 22, and in this passage is a ball check valve 24 which is normally held seated by means of a spring 23.

Figure 7:
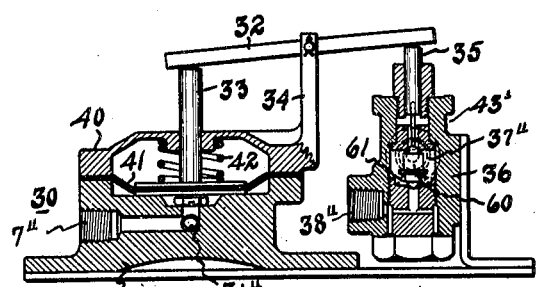
Fig. 7 is a vertical central cross-sectional view through the mechanism for operating a control valve through the agency of the pneumatic treadle.

In the operation of this device a stream of air under a pressure from one to two pounds per square inch is delivered from the source through pipe 9 passed the needle valve 21 through connection 7'' to the tube 7, from which it issues through the open end 7'. When there is no pressure on the treadle and with the contacts properly adjusted, the air flow is effected without causing the diaphragm to move out of the position shown in Fig. 4 in which position it is held by the spring 26 pressing on the upper surface thereof. However, as soon as pressure is applied to the tread plate of the treadle the soft rubber tube 7 is collapsed at one or more points with the result that the airflow therethrough is cut off or reduced. This action causes a back pressure to build up under diaphragm 20 with the result that it rises, compressing spring 26 and moving contact 10 into engagement with the fixed contacts. This completes the circuit to magnet valve 12 which controls the door engine, or any other device connected thereto. The magnet valve 12 is illustrated diagrammatically because it is very old and well known in this art. It may be noted, however, that it consists of a solenoid operated plunger which controls a valve of the structure clearly shown in Fig. 7. Thus the solenoid when energized would move a plunger causing the valve stem to descend. The operation of the magnet valve 12 may either connect pipes 16 and 17 together or disconnect them in accordance with well known practice. The ball check valve 24 is provided so that if the pressure on the diaphragm 20 exceeds a safe value this pressure will be relieved through the port in plug 22.

The straight pneumatic type shown in Fig. 6 employs the treadle of Fig. 1. In this case the pipe 7 connects to the small fluid pressure engine 30 which has a piston rod engaging with the lever 32 pivotally mounted on the bracket 34. The other end of lever 32 engages the valve stem 35 from the valve 36. This mechanism is shown in detail in Fig. 7. The small engine which operates the valve comprises a base plate 39 and a cover plate 40 between which is sealed the diaphragm 41 within a chamber. The piston rod or stem 33 is connected to the diaphragm and extends through the casing to engage it with the lever 32 pivotally mounted on the bracket 34. A spring 42 rests on the upper surface of the diaphragm and normally holds it in the position shown. The passage 7'' is connected directly to the tube 7. Another passage 31'' is connected by pipe 31 to a suitable fluid pressure source. The valves 36 comprise a body having a chamber within which are two seats controlled by the valve plunger 60. A spring 61 normally holds the valve plunger in the position shown. With the upper valve of the plunger seated on the upper seat the valve stem 35 projects through the casing and engages the pivoted lever 32. The passage 38'' is connected by pipe 38 to a suitable fluid pressure source. The passage 37'' which opens into the casing of the valve between seats is connected by the pipe 37 to the device to be controlled, such as a door motor.

As before, fluid under pressure from one to two pounds per square inch flows from the source through pipe 31 through the passage in the valve 30 to tube 7 and thence to the atmosphere through the open end 7'. When the flow of air through tube 7 is cut off by pressure applied to the treadle, diaphragm 41 rises with the result that valve 60 unseats from the upper seat and seats on the lower seat. This cuts off the supply of fluid pressure from pipe 38 to pipe 37 and connects pipe 37 to the atmosphere through the exhaust port 43' of the valve. Of course, as pointed out before this operation of the valve may establish a connection between pipes 37 and 38 rather than cut off a connection therebetween.

Figure 9:
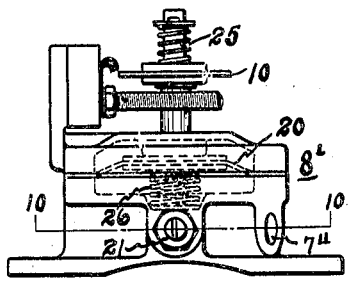
Fig. 9 is an elevational view of the vacuum operated switch.
Figure 10:
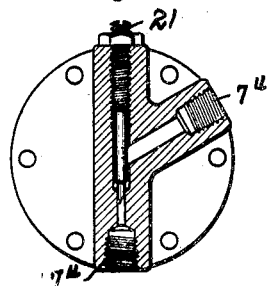
Fig. 10 is a cross-sectional view taken on the line 10—10 of Fig. 9.

The invention may also be applied to a socalled vacuum system which is really a fluid pressure system operating below atmospheric pressure. In such operation it is only necessary to reverse the action of the apparatus. Thus in the electro-pneumatic system the fluid pressure operated switch is merely arranged so that contact plate 10 is on the other side of the fixed contacts (see Fig. 8). In this case pipe 17 connects to a vacuum source and as before, tube 7 is connected to the other port. As shown in Figs. 9 and 10, the diaphragm 20 is normally held in raised position by the spring 26 which now presses on the underside thereof, holding contact plate 10 above the fixed contacts. Passage 17'' is connected by pipe 17 to the vacuum source. Passage 7'' is connected to the tube 7 of the treadle. As before, the adjustable needle valve 21 controls the movement of air from 17'' to 7''. In this case when tube 7 is closed by pressure on the treadle, the vacuum source will reduce the pressure under diaphragm 20 causing it to move downwardly compressing spring 26. This causes contact plate 10 to close the circuit connected to the fixed contacts.

Figure 12:
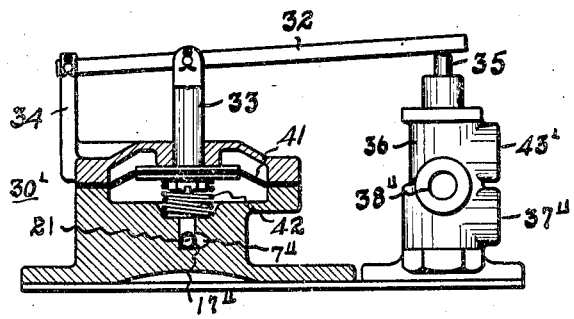
Fig. 12 is a view partly in vertical cross section and partly in elevation of the vacuum operated mechanism for actuating a control valve.

The full pneumatic arrangement is illustrated in Figs. 11 and 12. In this case the spring 42 presses on the lower surface of diaphragm 41 holding it in raised position as indicated in Fig. 12. In this case the bracket 34 pivotally supports lever 32 at one end and is pivotally connected to the stem 33 mounted on the diaphragm. The passage 17" is connected to the vacuum source and the passage 7" is connected to the flexible tube 7. The needle valve 21 is employed as previously described. When the movement of air through tube 7 is cut off a vacuum condition is created under diaphragm 41 so that it moves downwardly causing valve 36 to operate as previously described.

From the above description it will be apparent that this invention resides in certain principles of construction and operation as illustrated in the drawings. It is recognized that those skilled in the art may readily vary the application of these principles and the structure by which they are applied without departure from the scope of this invention. I do not, therefore, desire to be strictly limited to the disclosure as given for purpose of illustration, but rather to the scope of the appended claims.

What I seek to secure by United States Letters Patent is:

1. The combination as described comprising a control device, pressure fluid operated means for actuating the control device, a pressure fluid source connected to said means and a compressible treadle forming a pressure fluid conduit with and connected to said means and open to the atmosphere so that fluid normally flows through the conduit, whereby when pressure is applied to the treadle the conduit is closed and a back pressure is created to operate the pressure fluid operated means.

2. The combination as described comprising a compressible treadle having an air passage therethrough which is normally open to the atmosphere and which closes when the treadle is compressed, means for creating a continuous flow of air through said passage, and pressure fluid actuated means connected to said means, whereby when the air passage is closed the flow of air therethrough is cut off and said pressure fluid actuated means is operated.

ROSCOE D. CONKLIN.